(12) United States Patent
Tsai et al.

(10) Patent No.: US 11,985,314 B2
(45) Date of Patent: May 14, 2024

(54) METHODS AND APPARATUSES OF PROCESSING VIDEO DATA OF OUT-OF-BOUNDS NODES

(71) Applicant: MEDIATEK INC., Hsinchu (TW)

(72) Inventors: Chia-Ming Tsai, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW);
Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 234 days.

(21) Appl. No.: 17/420,837

(22) PCT Filed: Dec. 24, 2019

(86) PCT No.: PCT/CN2019/127834
§ 371 (c)(1),
(2) Date: Jul. 6, 2021

(87) PCT Pub. No.: WO2020/143442
PCT Pub. Date: Jul. 16, 2020

(65) Prior Publication Data
US 2022/0094922 A1  Mar. 24, 2022

Related U.S. Application Data

(60) Provisional application No. 62/793,281, filed on Jan. 16, 2019, provisional application No. 62/790,931, filed on Jan. 10, 2019.

(51) Int. Cl.
*H04N 19/119* (2014.01)
*H04N 19/169* (2014.01)
(Continued)

(52) U.S. Cl.
CPC ......... *H04N 19/119* (2014.11); *H04N 19/176* (2014.11); *H04N 19/1883* (2014.11); *H04N 19/96* (2014.11)

(58) Field of Classification Search
None
See application file for complete search history.

(56) References Cited

U.S. PATENT DOCUMENTS

| 10,542,294 B2 | 1/2020 | Huang et al. |
| 2009/0135909 A1 | 5/2009 | Chen et al. |

(Continued)

FOREIGN PATENT DOCUMENTS

| TW | 201739260 A | 11/2017 |
| WO | 2012/094342 A1 | 7/2012 |
| WO | 2017/157249 A1 | 9/2017 |

OTHER PUBLICATIONS

International Search Report and Written Opinion dated Mar. 24, 2020, issued in application No. PCT/CN2019/127834.

(Continued)

*Primary Examiner* — Kaitlin A Retallick
(74) *Attorney, Agent, or Firm* — McClure, Qualey & Rodack, LLP

(57) ABSTRACT

Video processing methods and apparatuses in a video encoding or decoding system for processing out-of-bounds nodes in a current picture. An out-of-bounds node is a coding tree node with a block region across a current picture boundary. The video processing method or apparatus determines an inferred splitting type, applies the inferred splitting type to split the out-of-bounds node into child blocks, adaptively splits each child block into one or multiple leaf blocks, and encodes or decodes the leaf blocks in the out-of-bounds node inside the current picture. The inferred splitting type for partitioning out-of-bounds nodes in an inter slice, pic- (Continued)

ture, or tile is the same as the inferred splitting type for partitioning out-of-bounds nodes in an intra slice, picture, or tile.

16 Claims, 10 Drawing Sheets

(51) Int. Cl.
  *H04N 19/176* (2014.01)
  *H04N 19/96* (2014.01)

(56) References Cited

U.S. PATENT DOCUMENTS

| | | | |
|---|---|---|---|
| 2015/0003516 | A1 | 1/2015 | Kim et al. |
| 2021/0084299 | A1* | 3/2021 | Gao ............ H04N 19/176 |
| 2021/0120275 | A1* | 4/2021 | Misra ............ H04N 19/96 |
| 2021/0211666 | A1* | 7/2021 | Gao ............ H04N 19/132 |

OTHER PUBLICATIONS

Tsai, C.M., et al.; "CE1-related: Picture boundary handing with VPDU constraints;" Joint Video Experts Team (JVET) of ITU-T SG 16 WP 3 and ISO/IEC JTC 1/SC 29/WG 11; Jan. 2019; pp. 1-319.

Hsiang, S.T., et al.; "CE1.2.0.10: CU partitioning along picture boundaries;" Joint Video Experts Team (JVET) of ITU-T SG 16 WP 3 and ISO/IEC JTC 1/SC 29/WG 11; Jul. 2018; pp. 1-157.

Hsu, C.W., et al.; "CE1-related: Constraint for binary and ternary partitions;" Joint Video Experts Team (JVET) of ITU-T SG 16 WP 3 and ISO/IEC JTC 1/SC 29/WG 11; Jul. 2018; pp. 1-19.

Chinese language office action dated Apr. 22, 2021, issued in application No. TW 108147793.

Extended European Search Report dated Oct. 7, 2022, issued in application No. EP 19908875.8.

Chen, J., et al.; "Algorithm description for Versatile Video Coding and Test Model 3;" Joint Video Experts Team (JVET) of ITU-T SG 16 WP 3 and ISO/IEC JTC 1/SC 29/WG 11; Dec. 2018; pp. 1-37.

Xu, M., et al.; "CE1-related: Non-square virtual pipeline data unit;" Joint Video Experts Team (JVET) of ITU-T SG 16 WP 3 and ISO/IEC JTC 1/SC 29/WG 11; Sep. 2018; pp. 1-2.

Tsai, C., et al.; "CE1-related: Picture boundary CU split satisfying the VPDU constraint;" Joint Video Experts Team (JVET) of ITU-T SG 16 WP 3 and ISO/IEC JTC 1/SC 29/WG 11; Jan. 2019; pp. 1-6.

* cited by examiner

METHODS AND APPARATUSES OF PROCESSING VIDEO DATA OF OUT-OF-BOUNDS NODES

CROSS REFERENCE TO RELATED PATENT APPLICATION(S)

The present invention claims priority to U.S. Provisional Patent Application, Ser. No. 62/790,931, filed on Jan. 10, 2019, entitled "Pipeline Unit Constraints on Binary Tree and Ternary Tree", and U.S. Provisional Patent Application, Ser. No. 62/793,281, filed on Jan. 16, 2019, entitled "Pipeline Unit Constraints with Picture Boundary Handling for Inter and Intra Picture". The U.S. Provisional Patent Applications are hereby incorporated by reference in their entireties.

TECHNICAL FIELD

The present invention relates to video processing methods and apparatuses to encode or decode video data in a video coding system. In particular, the present invention relates to partitioning video data at picture boundaries.

BACKGROUND

The High-Efficiency Video Coding (HEVC) standard is the latest video coding standard developed by the Joint Collaborative Team on Video Coding (JCT-VC) group of video coding experts from the ITU-T Study Group. The HEVC standard relies on a block-based coding structure which splits each video picture into multiple non-overlapped square Coding Tree Units (CTUs), also called Largest Coding Units (LCUs). Each individual CTU in a video picture or a slice is processed in a raster scanning order. In the HEVC main profile, the maximum and the minimum sizes of a CTU are specified by syntax elements signaled in the Sequence Parameter Set (SPS). Each CTU is further recursively partitioned into one or more non-overlapped Coding Units (CUs) using quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure is illustrated in FIG. 1, where the solid lines indicate CU boundaries in the CTU 10.

Once the CTUs are partitioned into leaf CUs, each leaf CU is subject to further split into one or more Prediction Units (PUs) according to a PU splitting type for prediction. Unlike the recursive quadtree splitting for CUs, each leaf CU may only be split once to form one or more PUs. The PU works as a basic representative block for sharing prediction information as the same prediction process is applied to all pixels in the PU. The prediction information is conveyed to the decoder on a PU basis. After obtaining residual data generated by the prediction process based on the PU splitting type, the residual data belonging to a leaf CU is partitioned into one or more Transform Units (TUs) according to another quadtree splitting structure for transforming the residual data into transform coefficients for compact data representation. The dashed lines in FIG. 1 indicate TU boundaries in the CTU 10. The TU is a basic representative block for applying transform and quantization on the residual data or transform coefficients. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional (2-D) sample array of one color component associated with the CTU, CU, PU, and TU respectively. For example, a CTU consists of one luminance (luma) CTB, two chrominance (chroma) CTBs, and its associated syntax elements. A similar relationship is valid for CU, PU, and TU. In the HEVC system, the same quadtree splitting structure is generally applied to both luma and chroma components unless a minimum size for the chroma block is reached.

Binary-tree (BT) splitting structure is another partition structure which recursively divides a block into two smaller blocks. A simplest binary-tree splitting structure only allows symmetrical horizontal splitting type and symmetrical vertical splitting type. For a given block with size M×N, a first flag is signaled to indicate whether this block is partitioned into two smaller blocks, followed by a second flag indicating the splitting type if the first flag indicates splitting. This M×N block is split into two blocks of size M×N/2 if the splitting type is symmetrical horizontal splitting, and this M×N block is split into two blocks of size M/2×N if the splitting type is symmetrical vertical splitting. Both the minimum allowed width and height need to be indicated since the binary-tree splitting structure is capable of splitting a block either horizontally or vertically. Horizontal splitting is implicitly not allowed if a block height is smaller than the minimum allowed height, and similarly, vertical splitting is implicitly not allowed if a block width is smaller than the minimum allowed width.

In addition to quadtree splitting and Binary-Tree (BT) splitting, Ternary-Tree (TT) splitting is an alternative splitting type to split video data. TT splitting is designed to capture objects in the center of blocks. FIG. 2 illustrates five previously described splitting types including quadtree splitting type 20, binary-tree splitting types 22 and 24, and ternary-tree splitting types 26 and 28. The vertical center-side ternary-tree splitting type 26 and horizontal center-side ternary-tree splitting type 28 divide a block into three smaller blocks, all having reduced sizes in one spatial dimension while keeping the same size in the other spatial dimension. If all three splitting types are employed, a block may be iteratively partitioned by quadtree splitting 20, vertical BT splitting 22, horizontal BT splitting 24, vertical TT splitting 26, or horizontal TT splitting 28. A leaf node is a Coding Unit (CU) for prediction and transform and will not be further split.

The HEVC standard supports 35 intra prediction modes including 33 angular modes, DC mode, and Planar mode. An intra predictor of a current block is derived from neighboring reference samples according to one intra prediction mode selected from the 35 modes. If an angular mode is selected, the value of each sample in a current block is predicted by extrapolating the samples from the reference samples according to the prediction direction of the selected angular mode. The value of each sample in the current block is calculated assuming an amplitude surface with a horizontal and vertical smooth gradient derived from the boundaries samples of the neighboring block if Planar mode is selected. The value of each sample of the current block is an average of the reference samples if DC mode is selected. The selected intra prediction mode is signaled explicitly or inferred from a previously decoded mode of an above or left neighboring block of the current block. The intra prediction modes of the above and left neighboring blocks are included in a set of three Most Probable Modes (MPMs). A first MPM flag is signaled to indicate whether the selected mode is identical to one of the three MPMs, if so, another flag is sent to indicate which of the three MPMs is selected; if the first MPM flag is false, the selected mode is explicitly signaled using a 5-bits fixed length codeword. The 33 angular modes used in the HEVC standard are shown in FIG. 3, where H represents the direction of Horizontal mode and V represents the direction of Vertical mode. The number of intra prediction modes in the next-generation video coding standard is expected to expand to 67 modes including DC, Planar, and 65 angular modes. Each of the angular modes can be represented by mode H+k or mode V+k, where k=0, +−1, +−2, . . . +−16. Mode H−16 and mode V−16 are the same mode as this mode refers to the prediction direction from an upper-left corner to the center of the current block.

SUMMARY

Methods and apparatuses of video processing in a video coding system for encoding or decoding video data in video pictures comprise receiving input data associated with a current block in a current picture, determining if the current block is an out-of-bound node, determining an inferred splitting type for the current block if it is an out-of-bounds node, applying the inferred splitting type to split the current block into child blocks if the current block is an out-of-bounds node, and adaptively splitting each child block into one or more leaf blocks, or adaptively splitting the current block into one or more leaf blocks if the current block is not an out-of-bounds node, and encoding or decoding the one or more leaf blocks in the current block inside the current picture. The out-of-bounds node is a coding tree node with a block region across a current picture boundary. The leaf blocks in the current block are Coding Units (CUs) in a Coding Tree Unit (CTU) according to an embodiment. In some embodiments, the inferred splitting type is only used to split the out-of-bounds node when the out-of-bounds node is larger than a predefined size. The out-of-bounds node less than or equal to the predefine size is not forced to be partitioned by the inferred splitting type. Some embodiments of the predefined size include a pipeline unit size, maximum transform size, and a multiple of the maximum transform size. The pipeline unit size is a size of a pipeline unit, and the pipeline unit is a basic unit for pipeline processing and is a non-overlapping grid divided from the current picture. Splitting information of the inferred splitting type for partitioning the out-of-bounds node larger than the predefined size is not signaled.

In one embodiment, the inferred splitting type for out-of-bounds nodes is quadtree splitting. In another embodiment, the inferred splitting type is determined according to the current picture boundary, for example, the inferred splitting type is horizontal binary-tree splitting when the current block is across a bottom picture boundary and the inferred splitting type is vertical boundary-tree splitting when the current block is across a right picture boundary.

In some embodiments of adaptively splitting each child block into leaf blocks further determine if any child block split from the current block is across a pipeline unit boundary, and the child block crossed the pipeline unit boundary is further split into leaf blocks until none of the leaf blocks is across the pipeline unit boundary. The pipeline unit boundary is a boundary of a pipeline unit, and the pipeline unit is a grid divided from the current picture, these non-overlapping grids are designed to allow different pipeline stages in the video coding system to process successive pipeline units simultaneously. In another embodiment of adaptively splitting each child block further determine if a width or height of any child block is larger than a threshold, and the child block with a width or height larger than the threshold is split until the width or height is smaller than or equal to the threshold. An example of the threshold is set equal to a pipeline unit width or height, a maximum transform width or height, or a multiple of the maximum transform width or height.

In one embodiment, the inferred splitting type for the current block is one of valid splitting types, and each of the valid splitting types split the current block into child blocks not crossing a pipeline unit boundary. For an out-of-bounds node with a partition depth equal to 0 (i.e. the first depth), the inferred splitting type for the out-of-bounds node is the same for all out-of-bounds nodes in inter and intra slices, pictures, or tiles.

A partition constraint may be applied to split each child block into one or more leaf blocks or split the current block into one or more leaf blocks, where the partition constraint restricts each leaf block to be completely contained in one pipeline unit or restricts each leaf block containing complete one or more pipeline units. A re-visit constraint may be applied to split each child block into one or more leaf blocks or split the current block into one or more leaf blocks, where the re-visit constraint is violated if processing of the leaf blocks requires re-visiting a pipeline unit after leaving the pipeline unit.

A variation of the methods and apparatuses of video processing in a video coding system receives input data of a current block in a current picture, determines if the current block is an out-of-bounds node with a partition depth equal to 0 (i.e. the first depth), determines a first splitting type for the current block if it is an out-of-bounds node with a partition depth equal to 0, applies the first splitting type to split the current block into child blocks and adaptively splits each child block into one or more leaf blocks if the current block is an out-of-bounds node with a partition depth equal to 0, or adaptively splits the current block into one or more leaf blocks if the current block is not an out-of-bounds node with a partition depth equal to 0, and encodes or decodes the one or more leaf nodes of the current-block inside the current picture. The first splitting type for partitioning out-of-bounds nodes in an inter slice, picture, or tile is the same as the first splitting type for partitioning out-of-bounds nodes in an intra slice, picture, or tile. In one embodiment, the first splitting type is quadtree splitting. In some embodiments, not only is the first splitting type the same for inter and intra slices, picture, or tiles, a same partitioning method is applied to partition out-of-bounds nodes in inter and intra slices, pictures, or tile. The partitioning method splits the child block in the current block into leaf blocks by satisfying a partition constraint, a re-visit constraint, or both the partition and re-visit constraints, where the partition constraint restricts each leaf block to be completely contained in one pipeline unit or restricts each leaf block contains complete one or more pipeline units, and the re-visit constraint is violated if processing of the leaf blocks requires re-visiting a pipeline unit after leaving the pipeline unit.

Aspects of the disclosure further provide an apparatus implemented in a video encoding system or a video decoding system, and the apparatus partitions a current block in a current picture into leaf blocks using an inferred splitting type if the current block is an out-of-bounds node. In one embodiment, the inferred splitting type is used to split the out-of-bounds node when the out-of-bounds node is larger than a predefined size. An embodiment of the apparatus is implemented in a block partitioning module of the video encoding or decoding system.

Aspects of the disclosure further provide a non-transitory computer readable medium storing program instructions for causing a processing circuit of an apparatus to perform video coding process to encode or decode out-of-bounds nodes using an inferred splitting type. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF PREFERRED IMPLEMENTATIONS

Figure 1:
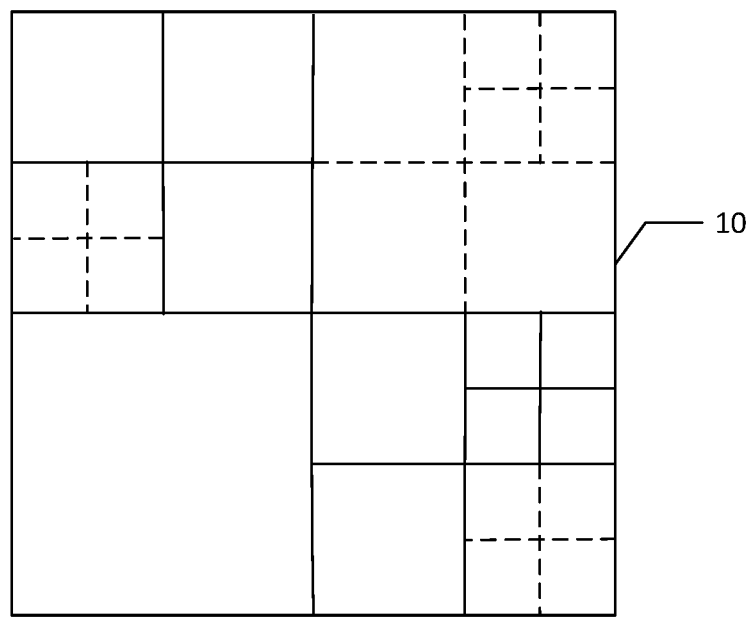
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2:
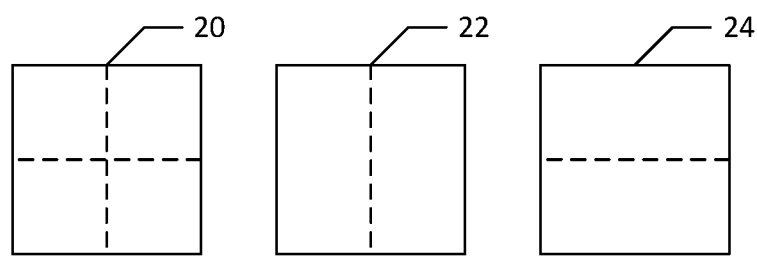
FIG. 2 illustrates five splitting types for splitting video data.
Figure 2:
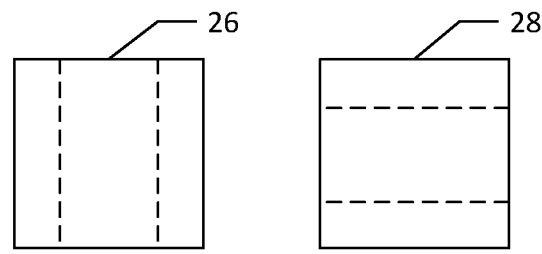

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Concept of VPDU A Virtual Pipeline Data Unit (VPDU) is defined as a basic unit for pipeline processing, and the VPDU is also called a pipeline unit in the following description. By dividing a video picture into multiple non-overlapping grids for pipeline processing, successive VPDUs may be processed by multiple pipeline stages at the same time. A VPDU is a non-overlapping grid in the video picture, which is either a square unit, for example, each VPDU contains M×M luma pixels or N×N chroma pixels, or a VPDU can be a non-square unit. The dimension of a VPDU may be defined by an area, such as 4096 pixels, or a size, such as 64×64 luma samples or chroma samples. In another embodiment, a CTU is divided into one or more pipeline units where, for example, each CTU is divided into M×N pipeline units. In one example, M and N are equal to 2. In one embodiment, a CTU is divided into one or more grids, and each grid is a pipeline unit, and in one example, the size of the pipeline unit is set to be equal to the maximum transform block size.

In hardware decoders, each VPDU is processed by one pipeline stage after another pipeline stage until each VPDU is processed by all the pipeline stages of video decoding. Different pipeline stages in the hardware decoder process different VDPUs simultaneously. Restricting a VPDU size to be within a size limit is a critical design issue in hardware implementation as the VPDU size is roughly proportional to the buffer size in most of the pipeline stages.

An embodiment of the VPDU size is set to be equal to the maximum Transform Block (TB) size, which is 32×32 luma pixels or 16×16 chroma pixels for HEVC hardware decoders. However, the maximum TB size is expected to be enlarged in the next-generation video coding standard as expending the maximum TB size improves the overall coding efficiency. For example, the maximum TB size for luma is expanding from 32×32 to 64×64 and the maximum TB size for chroma is expanding from 16×16 to 32×32 in a 4:2:0 color format. The VPDU size of the next-generation video coding standard is expected to be enlarged to 64×64 for luma or 32×32 for chroma when the color format is 4:2:0, which is four times larger than the VPDU size required by the HEVC standard. In comparison to the HEVC standard, which only employs quadtree splitting, the next-generation video coding standard allows partitioning CTUs with more flexible splitting types to achieve additional coding gains. For example, when partitioning a 128×128 CTU by binary-tree splitting or ternary-tree splitting, the required VPDU size is increased to 128×128 luma pixels or 64×64 chroma pixels. In comparison to the HEVC standard, the required VPDU size is now 16 times larger, which dramatically increases the required buffer size for each pipeline stage in video processing.

In order to reduce the required VPDU size in the next-generation video coding standard, some embodiments of the present invention partition a current block across a picture boundary according to an inferred splitting type. Some other embodiments unify a first splitting type applied to partition an out-of-bounds node with a partition depth equal to 0 in both inter and intra slices. In one example, a video picture to be encoded or decoded may be divided into non-overlapping CTUs and each CTU contains one or more pipeline units for pipeline processing. A CTU across a picture boundary is also called an out-of-bounds node with a partition depth equal to 0 in this example. An embodiment of the pipeline unit has a size equal to a maximum transform block size. In another embodiment, the pipeline unit size is explicitly signaled at a sequence level, picture level, slice level, or block level. In yet another embodiment, the pipeline unit size is implicitly defined based on a profile or level according to the corresponding video compression standard. One or more constraints described in the following may be applied during block partitioning.

Each Pipeline Unit Contains Complete one or more Partitions A partition constraint restricts one or more pre-defined splitting type to be applied to a current block according to a relationship between the current block and one or more corresponding pipeline units. The current block is a CTU, a CU, a TU, or the current block is a quadtree, binary-tree, or ternary-tree partition that may be further partitioned. For example, if the current block is a CU, the partition depth of the CU is less than a maximum allowed CU depth. Similarly, if the current block is a TU, the partition depth of the TU is less than a maximum allowed TU depth. In another example, the current block is larger than a minimum allowed CU size if it is a CU or larger than a minimum allowed TU size if it is a TU. The partition constraint restricts each pipeline unit to contain one or more complete quadtree, binary-tree, or ternary-tree partitions. The partitions may be CUs or TUs. In other words, the partition constraint restricts each partition to be completely contained in one pipeline unit, such that the splitting type, which will result that at least one partition is not completely contained in one pipeline unit, is skipped, not being used or forbidden. For example, a pipeline unit contains one or more CUs after a splitting operation, and these CUs have to be completely inside the pipeline unit. During sub-tree partition, all samples in a sub-block partitioned from a current block by quad-tree, binary-tree, or ternary-tree splitting with a size smaller than or equal to a pipeline unit should be in the same pipeline unit. According to this partition constraint, any of quadtree splitting, binary-tree splitting, and ternary-tree splitting is allowed to partition a current block when the current block is equal to or smaller than a pipeline unit and the current block is completely within one pipeline unit, because all sub-blocks partitioned from the current block are still included in the same pipeline unit. In an exemplary embodiment of the partition constraint, when a size of a current block to be partitioned by quadtree splitting, binary-tree splitting, or ternary-tree splitting is larger than a size of a pipeline unit, a video encoder or decoder checks if all samples in each partition are in the same pipeline unit after the sub-tree partition operation, and this sub-tree partition operation is only allowed when all the samples in each partition are in the same pipeline unit. The pipeline unit contains one or more complete CUs or TUs after all splitting operations.

By complying with the partition constraint of containing complete CUs or TUs in a pipeline unit, pipeline unit boundaries are also CU boundaries or TU boundaries. In other words, CUs or TUs cannot cross pipeline unit boundary, and each segment of the pipeline unit boundary must also belong to a CU boundary or TU boundary. The pipeline unit boundary must align with either CU boundaries or TU boundaries according to this partition constraint.

Each CU Contains Complete one or more Pipeline Units Another partition constraint restricts a splitting type to be applied to a current CU when the current CU still contains one or more complete pipeline units. The second constraint restricts each children block partitioned by quadtree, binary-tree, or ternary-tree splitting to contain complete one or more pipeline units. For example, when a current CU contains one or more pipeline units after a sub-tree partition operation, these pipeline units are completely inside the current CU. Quadtree splitting, binary-tree splitting, or ternary-tree splitting is only allowed to partition a current block when each of the partitions resulting from the splitting operation still includes one or more complete pipeline units. In an embodiment of this partition constraint, all samples in one pipeline unit are included in the same partition split from quadtree splitting, binary-tree splitting, or ternary-tree splitting with a size greater than or equal to the pipeline unit.

Applying One of the Partition Constraints For each CU partitioned from a CTU by one or more splitting types, one of the two previously described partition constraints has to be met. A splitting type is not allowed to partition a current block if any partition split from the current block by the splitting type violates both the partition constraints. For example, either one or more CUs are completely contained in a pipeline unit or one or more pipeline units are completely contained in one CU, where each CU is partitioned from a CTU by one or a combination of quadtree splitting, binary-tree splitting, or ternary-tree splitting.

Partition Constraint with Re-visit Constraint Some embodiments of the partition constraint evaluate the validity of a predefined splitting type according to a re-visit constraint, in which a processing order of sub-blocks partitioned from a current block by a predefined splitting type shall not allow leaving a pipeline unit and then re-visiting the pipeline unit again. The predefined splitting type is not allowed to partition the current block if the re-visit constraint is violated. The re-visit constraint is violated when processing of the sub-blocks requires re-visiting a pipeline unit after leaving the pipeline unit.

Infer Splitting Type for Out-of-bounds Node A coding tree node or a CU that corresponds to a block region entirely inside current picture boundaries is referred to as an in-bounds node or in-bounds CU. A coding tree node or CU that corresponds to a block region across current picture boundaries is referred to as an out-of-bounds node or out-of-bounds CU. When each in-bounds node is further partitioned, the video encoding or decoding system is free to split the in-bounds node into smaller blocks by any splitting type which obeys one of the partition constraints disclosed in the present invention. According to embodiments of the present invention, to partition a current block which is an out-of-bounds node, the video encoding or decoding system uses an inferred splitting type to split the current block into child blocks before considering boundary splitting. Each of the child blocks completely or partially inside the current picture is adaptively split into one or more leaf blocks, such as one or more leaf CUs.

Figure 4:
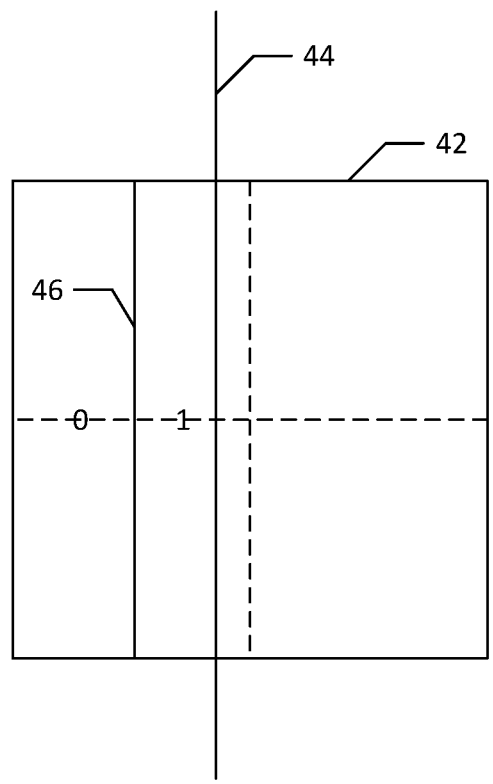
FIG. 4 illustrates an example of splitting an out-of-bounds node according to the picture boundary direction.

FIG. 4 illustrates an example of splitting an out-of-bounds node crossing a right picture boundary by considering boundary splitting. As shown in FIG. 4, the right picture boundary 44 divided the out-of-bounds node 42 into two areas, one area inside the current picture (i.e., the area at the left side of the right picture boundary 44) and another area outside the current picture. The out-of-bounds node 42 in this example is a CTU with a size equal to 128×128 luma samples. The size of a pipeline unit in this example is 64×64 luma samples, and the pipeline unit boundaries inside the out-of-bounds node 42 are shown by dashed lines in FIG. 4. Conventional video encoding or decoding system partitions each out-of-bounds node by first considering boundary splitting according to the picture boundary, for example, horizontal binary-tree splitting is used to partition out-of-bounds nodes across the bottom picture boundary, vertical binary-tree splitting is used to partition out-of-bounds nodes across the right picture boundary, and quadtree splitting is used to partition out-of-bounds nodes across both the bottom and right picture boundaries. In FIG. 4, the left half of the out-of-bounds node 42 is therefore split by vertical binary-tree splitting 46 into child block 0 and child block 1. If both the child blocks are not further split after vertical binary-tree splitting from the out-of-bounds node 42, none of the child blocks satisfies any of the above described partition constraints. Both the child blocks 0 and 1 cross the pipeline unit boundary which also violates the re-visit constraint. Embodiments of the present invention partition out-of-bounds nodes with an inferred splitting type before considering boundary splitting to ensure child blocks partitioned from the out-of-bounds nodes meet one of the partition constraints and will not violate the re-visit constraint.

In some embodiments of splitting an out-of-bounds node, when a size of the out-of-bounds node is larger than a predefined size, the out-of-bounds node is forced to be further divided by an inferred splitting type into child blocks. Some examples of the predefined size is set to be a pipeline unit size, maximum transform size, or a multiple of the maximum transform size. For example, the predefined size is 128×128 luma samples or 64×64 luma samples. In one embodiment, for each child block partitioned from an out-of-bounds node, if this child block is still an out-of-bounds node and the block size or area of the child block is larger than the predefined size, the child block is forced to be further divided by the inferred splitting type again. Splitting information of the inferred splitting type for partitioning out-of-bounds nodes larger than the predefined size is not signaled.

Figure 5A:
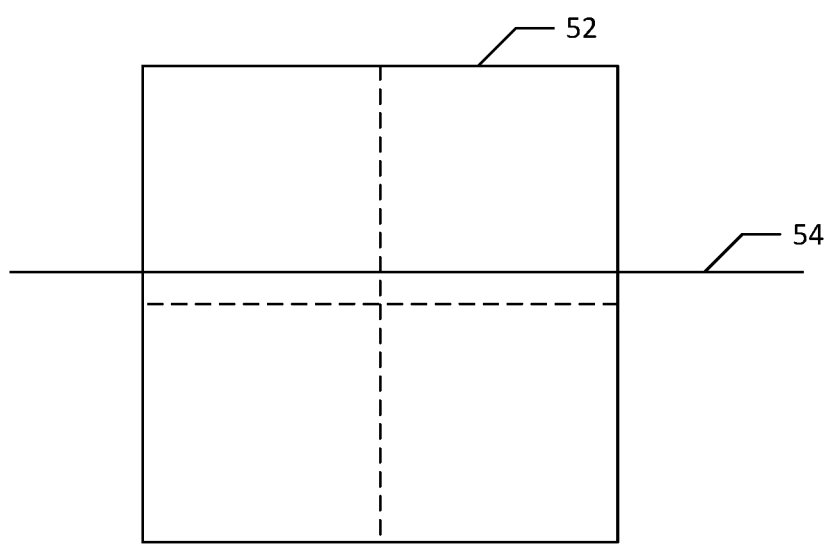
FIGS. 5A and 5B illustrate an example of splitting an out-of-bounds node across a bottom picture boundary according to an embodiment of the present invention.
Figure 5B:
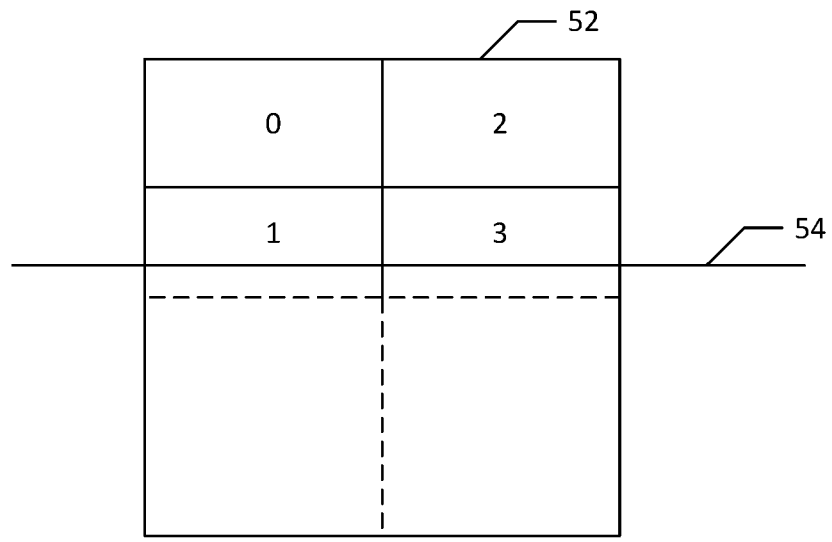
Figure 6A:
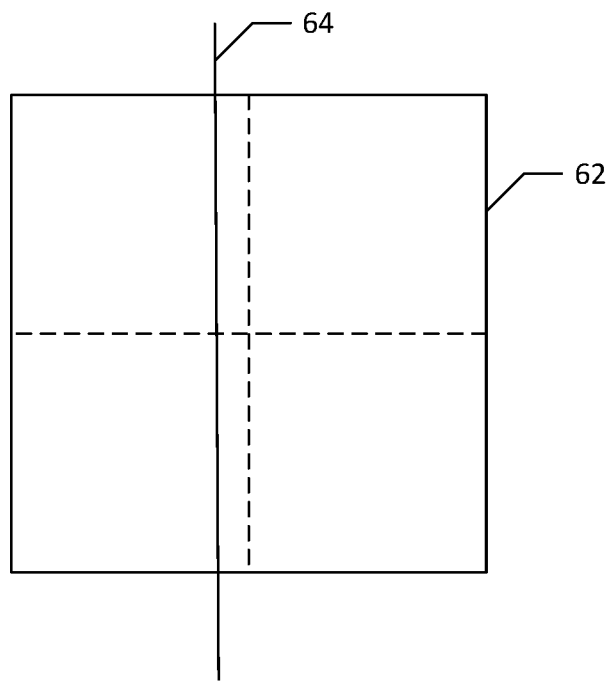
FIGS. 6A and 6B illustrate an example of splitting an out-of-bounds node across a right picture boundary according to an embodiment of the present invention.
Figure 6B:
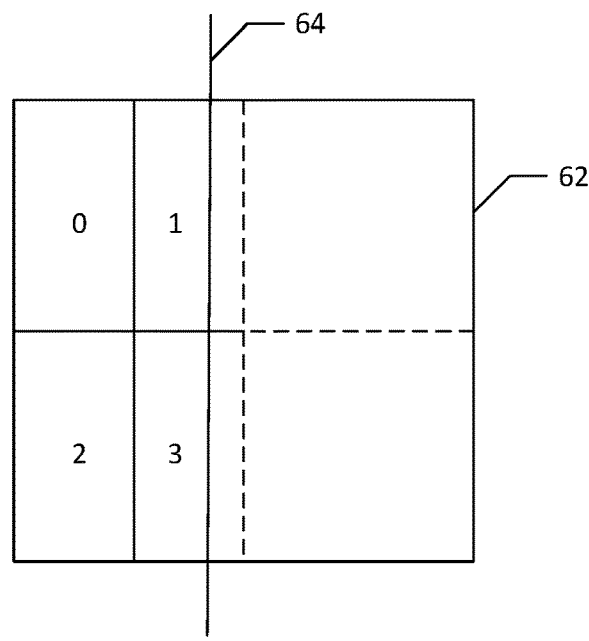

The inferred splitting type is quadtree splitting according to an embodiment of the present invention. In this embodiment, each out-of-bounds node or out-of-bounds CU with a size larger than a predefined size is always further split by quadtree splitting into four child blocks. The predefined size is equal to a pipeline unit size, maximum transform size, a multiple of the maximum transform size, 128×128 luma samples, or 64×64 luma samples. Splitting information for partitioning out-of-bounds nodes larger than the predefined size is inferred and thus not signaled in the video bitstream. FIGS. 5A and 5B illustrate partitioning an out-of-bounds node with a size larger than a predefined size according to this embodiment. The predefined size is a pipeline unit size, and the out-of-bounds node 52 is four times larger than the pipeline unit size. For example, the pipeline unit size is 64×64 luma samples, and the out-of-bounds node 52 is 128×128 luma samples. The out-of-bounds node 52 crosses the bottom picture boundary 54 as shown in FIGS. 5A and 5B. FIG. 5A shows the out-of-bounds node 52 with a partition depth equal to 0. According to this embodiment, the top half of the out-of-bounds node 52 is partitioned into four child blocks by the inferred splitting type, which is quadtree splitting. FIG. 5B shows the out-of-bounds node 52 with a partition depth equal to 1. The processing order of these four child blocks in the out-of-bounds node 52 is child block 0, child block 1, child block 2, and then child block 3 as shown in FIG. 5B, which does not violate the re-visit constraint. FIGS. 6A and 6B illustrate partitioning another out-of-bounds node with a size larger than a predefined size according to this embodiment. This out-of-bounds node 62 crosses the right picture boundary 64, and is also four times larger than the predefined size. For example, the pipeline unit size is 64×64 luma samples and the out-of-bounds node 62 is 128×128 luma samples. FIG. 6A shows the out-of-bounds node 62 with a partition depth equal to 0 and FIG. 6B shows the out-of-bounds node 62 with a partition depth equal to 1. The inferred splitting type for partitioning this out-of-bounds node 62 is also quadtree splitting, and the resulting child blocks are processed in an order of child block 0, child block 1, child block 2, and then child block 3. As shown in FIG. 6B, the child blocks of this out-of-bounds node will not violate the partition and re-visit constraints.

In another embodiment, the preferred splitting type for partitioning an out-of-bounds node larger than a predefined size is horizontal binary-tree splitting when the out-of-bounds node crosses a bottom picture boundary, or the preferred splitting type is vertical binary-tree splitting when the out-of-bounds node crosses a right picture boundary. Splitting information is implicitly derived according to a location of the out-of-bounds node and thus not signaled in this embodiment. In one embodiment of partitioning an out-of-bounds node by inferred horizontal or vertical binary-tree splitting, if a current node after the inferred splitting crosses a pipeline unit boundary or crosses a certain grid, the current node is forced to further split until none of the leaf blocks cross the pipeline unit boundary or the grid. In another embodiment, if a current node after the inferred splitting having a width or height larger than a threshold, vertical binary-tree splitting or horizontal binary-tree splitting is inferred to make the width or height to be smaller than or equal to the threshold. A size of the certain grid may be the same as a pipeline unit size, a predefined value such as 64×64, or is equal to a maximum TU size, width, or height. Some examples of the threshold are equal to a pipeline unit width or height, a predefined value such as 64, or a maximum TU size, width, or height. Splitting information is inferred and thus not signaled in the video bitstream.

In yet another embodiment, the inferred splitting type is one of valid splitting types. In this embodiment, for an out-of-bounds node with a size larger than a predefined size, a valid splitting type splits the out-of-bounds node into blocks without crossing a pipeline unit boundary or M×N grid. An example of the pipeline unit boundary is a boundary of each 64×64 luma samples. For example, when a current CTU or block crosses a right picture boundary and a height of the current CTU or block is larger than a pipeline unit height or N, quadtree splitting or horizontal binary-tree splitting are both valid splitting types. When a current CTU or block crosses a bottom picture boundary and a width of the current CTU or block is larger than a pipeline unit width or M, quadtree splitting or vertical binary-tree splitting are valid splitting types. If a current CTU or block crosses a right picture boundary and a height of the current CTU or block is smaller than or equal to a pipeline unit height or N, quadtree splitting or vertical binary-tree splitting are valid splitting types. If a current CTU or block crosses a bottom picture boundary and a width is smaller than or equal to a pipeline unit width or M, quadtree splitting or horizontal binary-tree splitting are valid splitting types. If a current CTU or block crosses both right and bottom picture boundaries, quadtree splitting is the only valid splitting type. In a specific embodiment, when a current CU crosses a bottom picture boundary, a current CU width is larger than a VPDU width or M and a current CU height is less than or equal to a VPDU height or N, a vertical splitting direction is inferred when a binary-tree splitting is selected. When a current CU crosses a right picture boundary, a current CU height is larger than a VPDU height or N and a current CU width is less than or equal to a VPDU width or M, a horizontal splitting direction is inferred when a binary-tree splitting is selected. In a more specific embodiment, M is equal to N and quadtree splitting is disabled when a current binary-tree or Multi-Type Tree (MTT) depth is greater than 0. When a current CU crosses a bottom picture boundary, a current CU width is larger than a VPDU width or M and a current CU height is less than or equal to a VPDU height or N, vertical binary-tree splitting is inferred to be used. When a current CU crosses a right picture boundary, a current CU height is larger than a VPDU height or N and a current CU width is less than or equal to a VPDU width or M, horizontal binary-tree splitting is inferred to be used. In another specific embodiment, at least one of the previously described VPDU partition constraints is applied to in-bounds nodes and out-of-bounds nodes. For the out-of-bounds nodes, an inferred splitting direction is determined by first considering the VPDU partition constraints before considering the picture boundary conditions.

One or more splitting syntax can be skipped or inferred if only a portion of the possible splitting types or splitting directions can be selected. For example, if horizontal binary-tree splitting is the only valid splitting type, qt_split_cu_flag, mtt_split_cu_vertical_flag, and mtt_plit_cu_binary_flag are not signaled. In another example, if the valid splitting types are quadtree splitting and horizontal binary-tree splitting, mtt_split_cu_vertical_flag and mtt_split_cu_binary_flag are not signaled. In another embodiment, the splitting syntax can still be signaled but the values are constrained to some values obeying the inferred splitting type or one of the valid splitting types. The encoder cannot violate the rule by selecting an invalid splitting type.

In still another embodiment, a maximum binary-tree size is different for in-bounds nodes and out-of-bounds nodes. For example, the maximum binary-tree size is 128×128 for the in-bounds nodes, and the maximum binary-tree size is 64×64 for the out-of-bounds nodes.

First Split for Out-of-bounds Nodes is the Same for Intra and Inter An in-bounds node completely inside the current picture boundaries can be partitioned by any of the available splitting types following one of the previously described partition constraints. In some embodiments of the present invention, the first splitting type, which is applied to an out-of-bounds node with a partition depth of 0 in an inter slice, picture, or tile, is always the same as the first splitting type, which is applied to an out-of-bounds node with a partition depth of 0 in an intra slice, picture, or tile. The first splitting type corresponds to the splitting type used to partition the out-of-bounds node with a partition depth equal to 0, where the out-of-bounds node is at the first depth. For example, the first splitting type is used to partition a CTU, so the same first splitting type is used to partition CTUs cross a picture boundary in both inter and intra slices, pictures, or tiles (in other words, the same first splitting type is used to partition CTUs cross a picture boundary no matter such CTUs to be split are in inter or intra slices, pictures, or tiles). In one embodiment, the first splitting type for partitioning out-of-bounds nodes in an intra slice, picture, or tile is quadtree splitting and the first splitting type for partitioning out-of-bounds nodes in an inter slice, picture, or tile is also quadtree splitting. In another embodiment, the first splitting type for partitioning out-of-bounds nodes in an intra slice is one of Multiple Type Tree (MTT) splits and the first splitting type for partitioning out-of-bounds nodes in an inter slice is also the same one of MTT splits. In yet another embodiment, the first splitting type for partitioning out-of-bounds nodes in an intra picture is binary-tree split, and the first splitting type for partitioning out-of-bounds nodes in an inter picture is also binary-tree split. In still another embodiment, out-of-bounds nodes in inter and intra slice, picture, or tile are partitioned using a same partitioning method which satisfies one of the previously described constraints. For example, the same partitioning method for partitioning the out-of-bounds nodes satisfies one or both the partition constraint and re-visit constraint. The same partitioning method refers not only to the first splitting type, but also one or more following partitioning methods or partitioning direction selection rules.

Figure 7A:
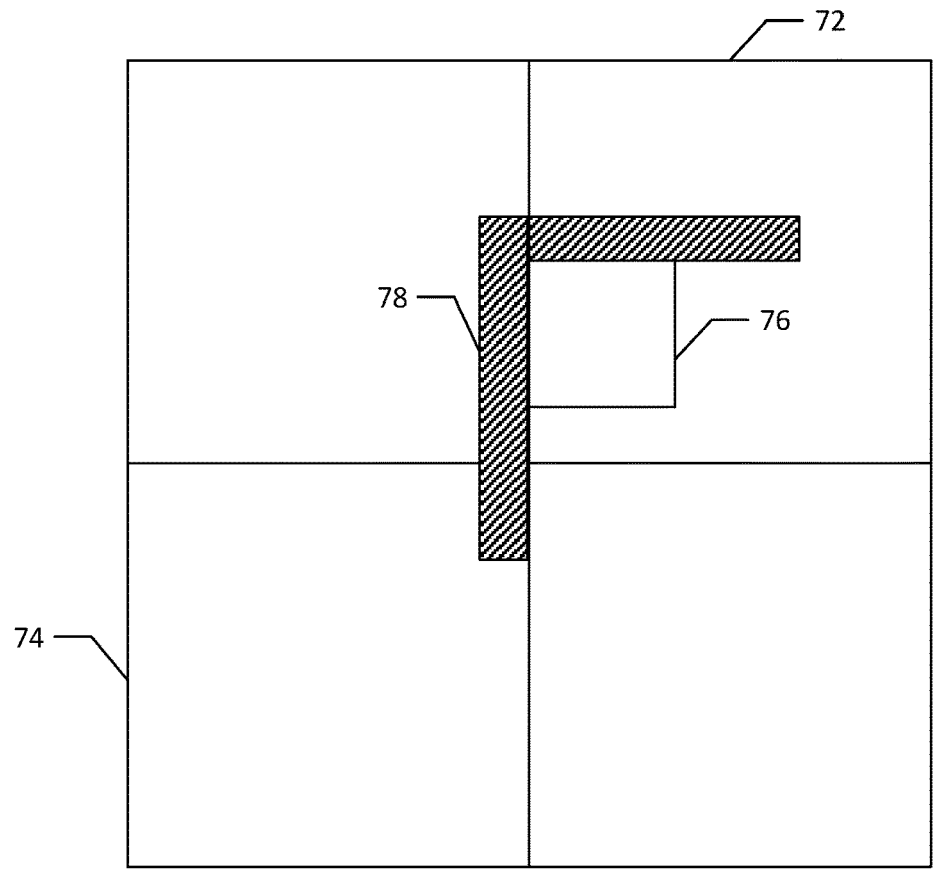
FIG. 7A illustrates an example of a reference constraint prohibiting using neighboring reconstructed samples located inside a left-bottom pipeline unit for predicting a current block.
Figure 7B:
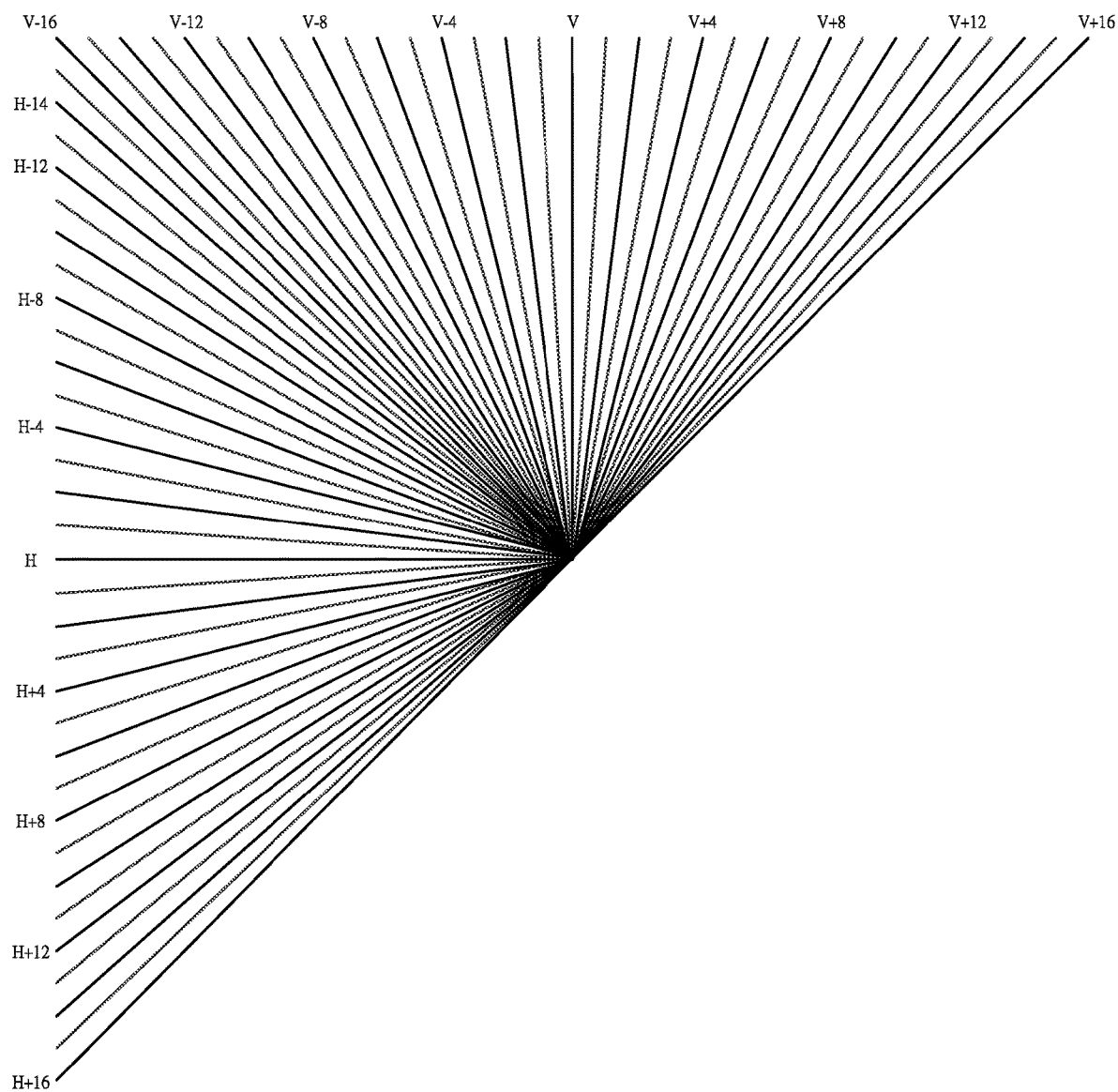
FIG. 7B illustrates an example of 65 angular intra prediction modes.

Prohibit Use Reconstructed Neighboring Samples from a Left-bottom Pipeline Unit In addition to the partition constraints and re-visit constraint, one more reference constraint is incorporated in any intra or inter prediction tool according to an embodiment. FIG. 7A and FIG. 7B illustrates an example of applying the reference constraint when generating a predictor according to this embodiment. As shown in FIG. 7A, a current CU 76 in a current pipeline unit 72 is under prediction, and a corresponding predictor is generated using reconstructed neighboring samples 78 of the current CU 76. A portion of the reconstructed neighboring samples 78 is inside a left-bottom pipeline unit 74 of the current pipeline unit 72, and this portion cannot be used to generate the predictor according to the reference constraint. In one example, this portion of the reconstructed neighboring samples 78 inside the left-bottom pipeline unit 74 is treated as not available. The prediction tool may be referred to angular intra prediction, linear model prediction, a linear model prediction method using left or top neighboring samples among different color components, or combined prediction using both intra and inter prediction.

Ternary-tree Splitting Constraint In some other embodiments, ternary-tree splitting is allowed for splitting a current block during partitioning when a partition depth of the current block is equal to or smaller than a maximum allowed sub-tree partitioning depth minus a threshold N. In one embodiment, the threshold N is implicitly indicated and inferred at a decoder side, and an indicator for selecting a ternary-tree splitting type is absent when the current sub-tree partition depth is larger than the maximum allowed sub-tree partitioning depth minus the threshold N. The threshold N is an integer.

In one embodiment, a current sub-tree partition depth is S for a current block, the maximum allowed sub-tree partitioning depth is denoted as M and the threshold is denoted as N, then ternary-tree splitting is allowed for splitting the current block when S≤(M−N), where M>N≥0. An indicator for selecting ternary-tree splitting is absent if the current sub-tree partition depth is larger than (M−N).

In one embodiment, the threshold N may be varied according to a slice type, color components of a current slice, or a temporal layer ID of the current slice. In this embodiment, all values of the threshold N are implicitly inferred at an encoder side and implicitly derived at a decoder side. An indicator for selecting a ternary-tree splitting type is absent when a current sub-tree partition depth is larger than the maximum allowed sub-tree partitioning depth minus the corresponding threshold N. In one example, the threshold is $N_1$ for blocks in an intra slice and $N_2$ for blocks in an inter slice. A current sub-tree partition depth is S for a current block and a maximum allowed sub-tree partitioning depth is denoted as M. If the current block is in an intra slice, ternary-tree splitting is allowed for partitioning the current block when $S \leq (M-N_1)$, and an indicator for selecting ternary-tree splitting is absent once $S > (M-N_1)$. Similarly, if the current block is in an inter slice, ternary-tree splitting is allowed for partitioning the current block when $S \leq (M-N_2)$, and an indicator for selecting ternary-tree splitting is absent once $S > (M-N_2)$.

Maximum Ternary-tree Constraint and Maximum Binary-tree Constraint In one embodiment, a maximum Ternary-Tree (TT) size (max_TT_size) is defined so TT splitting cannot be applied for CUs larger than this maximum TT size. The maximum TT size can be an M×N block, where M×N is a predefined value, a signaled value, a derived value, or set to equal to a maximum transform block size. An example of the predefined value is 64×64, and the signaled value may be signaled in or parsed from a sequence, picture, slice, or tile level, In some examples, the maximum TT size is derived depending on a CTU size or slice type. The maximum transform block size may be a maximum luma transform size or a maximum chroma transform size. In one example, M×N is equal to 64×64, which is the maximum transform block size defined in the next generation video coding standard, and a current CU larger than 64×64, such as 128×128, 128×64, or 64×128, cannot be partitioned by TT splitting.

In another embodiment, a maximum Binary-Tree (BT) size (max_BT_size) is defined so BT splitting including symmetrical BT and asymmetrical BT cannot be applied for CUs larger than this maximum BT size. The maximum BT size can be an M×N block, where M×N is a predefined value, a signaled value, a derived value, or set to equal to a maximum transform block size. An example of the predefined value is 64×64, and the signaled value may be signaled in or parsed from a sequence, picture, slice, or tile level, In some examples, the maximum BT size is derived depending on a CTU size or slice type. The maximum transform block size may be a maximum luma transform size or a maximum chroma transform size. In one example, M×N is equal to 64×64, which is the maximum transform block size defined in the next generation video coding standard, and a current CU larger than 64×64, such as 128×128, 128×64, or 64×128, cannot be partitioned by BT splitting.

In one embodiment, a maximum Binary Ternary Tree (BTT) size (max_BTT_size) is defined so both BT splitting and TT splitting cannot be applied to partition CUs larger than the maximum BTT size. BT splitting includes symmetrical BT and asymmetrical BT. The maximum BTT size is an M×N block, and M×N may be a predefined value, a signaled value, a derived value, or equal to a maximum transform block size. An example of the predefined value is 64×64, and the signaled value may be signaled in or parsed from a sequence, picture, slice, or tile level, In some examples, the maximum BT size is derived depending on a CTU size or slice type. The maximum transform block size may be a maximum luma transform size or a maximum chroma transform size.

In some other embodiments, block partitioning is restricted by one or more following partition constraints.
1. TT splitting cannot be applied to split a 128×128 CTU.
2. TT splitting cannot be applied to split a 128×64 CU or 64×128 CU.
3. Horizontal BT splitting cannot be applied to split a 128×N CU, where N is a height of the CU and is an integer larger than 2 or 4. For example, N is equal to 64.
4. Vertical BT splitting cannot be applied to split an N×128 CU, where N is a width of the CU and is an integer larger than 2 or 4. For example, N is equal to 64.
5. A size of a chroma CU cannot be smaller than P×Q, an example of P×Q is 4×4, and in this example, 4×2, 2×4, or 2×2 chroma CU is not allowed.
6. In separate coding tree, a size of a chroma CU cannot be smaller than P×Q, an example of P×Q is 4×4, and in this example, 4×2, 2×4, or 2×2 chroma CU is not allowed in separate tree coding.
7. A CU with a size equal to 128×128, 128×64, or 64×128 is allowed.

In one embodiment, in order to fit the z-scan of M×N blocks in a CTU, BT and TT splitting cannot be applied to partition a CU if the partitioned CU order cannot meet the z-scan constraint. For example, for a 128×128 CTU, vertical BT splitting is not allowed because the coding order of M×N blocks in the 128×128 CTU is not in the z-scan order.

In the above mentioned constraints, some conditions may be addressed for deciding whether the partition is valid or not. In the following examples, two values of W and H are used. W and H are integers, and can be predefined values, signaled values, derived values, or equal to the maximum transform block size, width, or height. Some examples of setting W and H by predefined values set W equal to 32 or 64 and set H equal to 32 or 64. If W and H are signaled values, corresponding syntax elements are signaled in a sequence, picture, slice, or tile level. In some examples, W and H are derived depending on the CTU size or slice type. The maximum transform block size, width, or height may be a size, width, or height of the maximum luma transform size or the maximum chroma transform size.
1. horizontal TT splitting cannot be applied to partition a CU if the CU width is larger than W and the CU height divide by 4 is smaller than H.
2. Vertical TT splitting cannot be applied to partition a CU if the CU height is larger than H and the CU width divide by 4 is smaller than W.
3. Horizontal BT splitting cannot be applied to partition a CU if the CU width is larger than W and the CU height is equal to or smaller than H.
4. Vertical BT splitting cannot be applied to partition a CU if the CU height is larger than H and the CU width is equal to or smaller than W.

The proposed constraints can be applied as normative constraints or encoder non-normative constraint. For example, if a splitting type is not allowed according to a partition constraint implemented as a normative constraint, associated partition information such as not-select or not-split is not signaled and is inferred as a fixed value. In another example, if a splitting type is not allowed according to a partition constraint implemented as an encoder non-normative constraint, corresponding partition information is still signaled, but the value is fixed according to a bitstream conformance constraint to obey the partition constraint. In one normative constraint example, partition syntax signaling is described as follows. Two integer values W and H are used to determine whether a CU can be further partitioned. W and H can be predefined values, signaled values, derived values, or equal to maximum transform block width and height. Horizontal TT splitting syntax is not signaled or parsed if a CU width is larger than W and a CU height divide by 4 is smaller than H. Vertical TT splitting syntax is not signaled or parsed if a CU width divide by 4 is smaller than W and a CU height is larger than H. Horizontal BT splitting syntax or BT split direction is not signaled or parsed if a CU width is larger than W and a CU height is equal to or smaller than H as horizontal BT splitting is inferred as not split or the BT split direction is inferred as vertical splitting. Similarly, vertical BT splitting syntax or BT split direction is not signaled or parsed if a CU height is larger than H and a CU width is equal to or smaller than W as vertical BT splitting is inferred as not split or the BT split direction is inferred as horizontal splitting.

Figure 3:
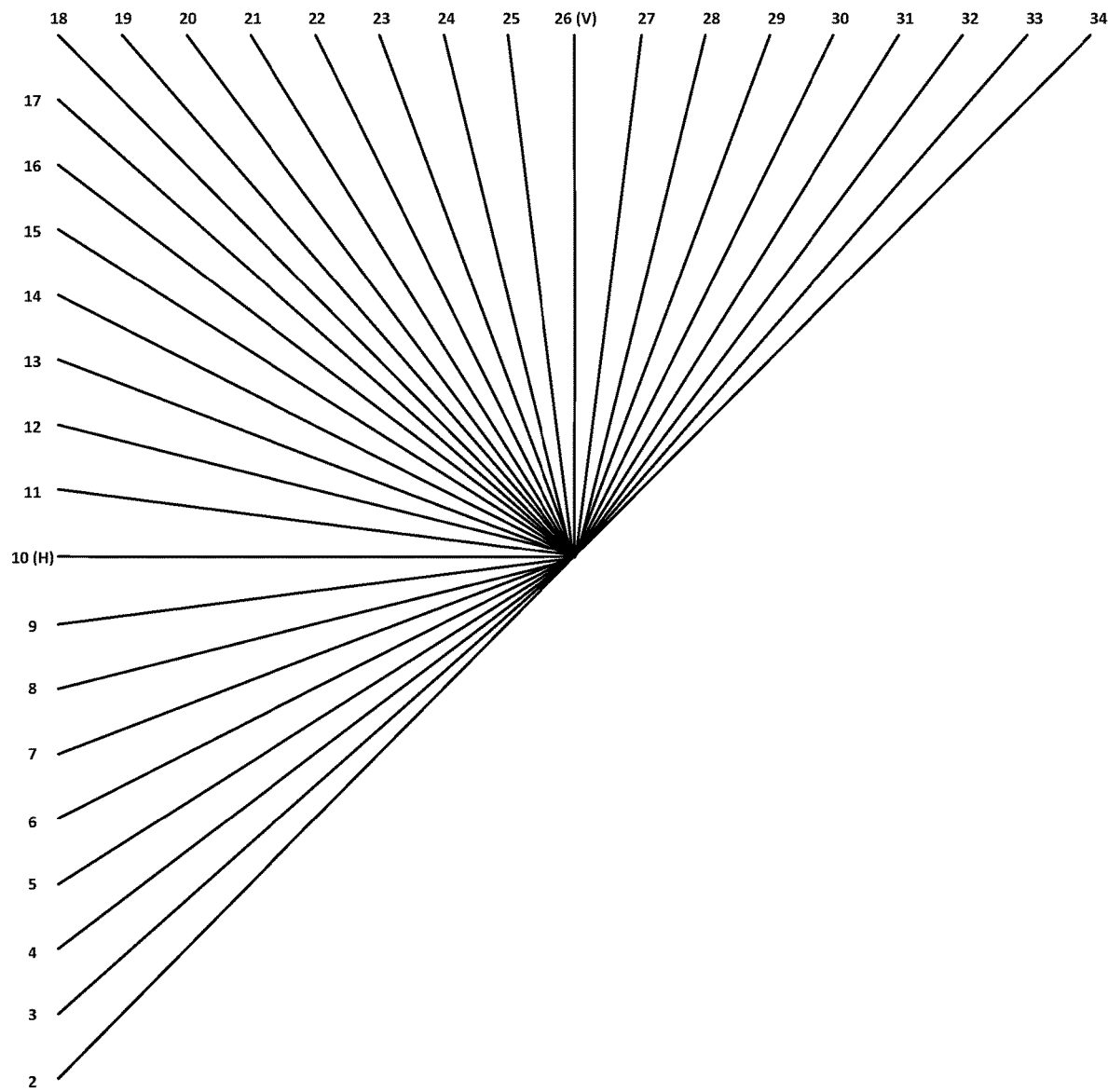
FIG. 3 illustrates 33 angular intra prediction modes supported in the HEVC standard.

Six MPMs and Sixty-four Remaining Modes Three Most Probable Modes (MPMs) are selected for each CU coded by intra prediction in the HEVC standard. One flag is signaled to decide whether a current intra mode is included in the MPMs. If the current intra mode is one of the MPMs, one MPM index is signaled to indicate which MPM is used; otherwise, a remaining index is signaled. In the next generation video coding standard, the total number of intra prediction modes is increased to 67. If 6 intra modes are selected as MPMs from the 67 intra prediction modes, there are 61 remaining modes. Since 61 is not a power of 2, 3 additional intra modes are added to make the total number of intra prediction modes to equal to 70 according to an embodiment. In this embodiment, there are 6 MPMs and 64 remaining modes that can be coded using a 6-bits fixed-length code. The 3 additional modes may include one or more angular modes, for example, a wide angular mode outside the 45 degrees and the 225 degrees. In one example, as shown in FIG. 3, one of the additional modes is the intra prediction mode below to mode 2, or right to mode 34. In another example, one or more additional modes can be one or more modes near vertical, horizontal, or diagonal modes, which reduce angular difference between the modes near vertical, horizontal, or diagonal modes. In another embodiment, one additional mode is a variation of Planar mode. For example, the generation of bottom-right position pixel of Planar mode can be different. Different Planar modes with different bottom-right position pixels can be added. In another embodiment, one or more additional modes can be a combined mode. For example, vertical mode plus Planar mode, horizontal mode plus Planar mode, vertical mode plus DC mode, or horizontal mode plus DC mode.

An embodiment selects 6 intra prediction modes as MPMs and leaves 64 remaining modes, where the 6 MPMs include 3 modes selected from the 67 intra prediction modes of the next-generation video coding standard, and 3 additional modes. The 64 remaining modes may be coded using 6-bits fixed length coding. An example of an additional mode is an angular mode, such as a wide angular mode. The wide angular mode may be selected from modes outside the 45-degree and the 225-degree, for example, the wide angular mode is an intra mode below to mode H+16 or an intra mode right to mode V+16 in FIG. 7B. In another example, an additional mode is a mode near Vertical, Horizontal, or Diagonal mode. The additional mode may be derived by reducing the angular difference between the mode near Vertical, Horizontal, or Diagonal mode. In another example, an additional mode is a variation of Planar mode, for example, the additional mode is derived using a different bottom-right position pixel than the one used in Planar mode. Different Planar modes with different bottom-right position pixels can be added to the MPMs. Another example of an additional mode is a combined mode blending two or more original modes, for example, Vertical mode plus Planar mode, Horizontal mode plus Planar mode, Vertical mode plus DC mode, or Horizontal mode plus DC mode.

Figure 8:
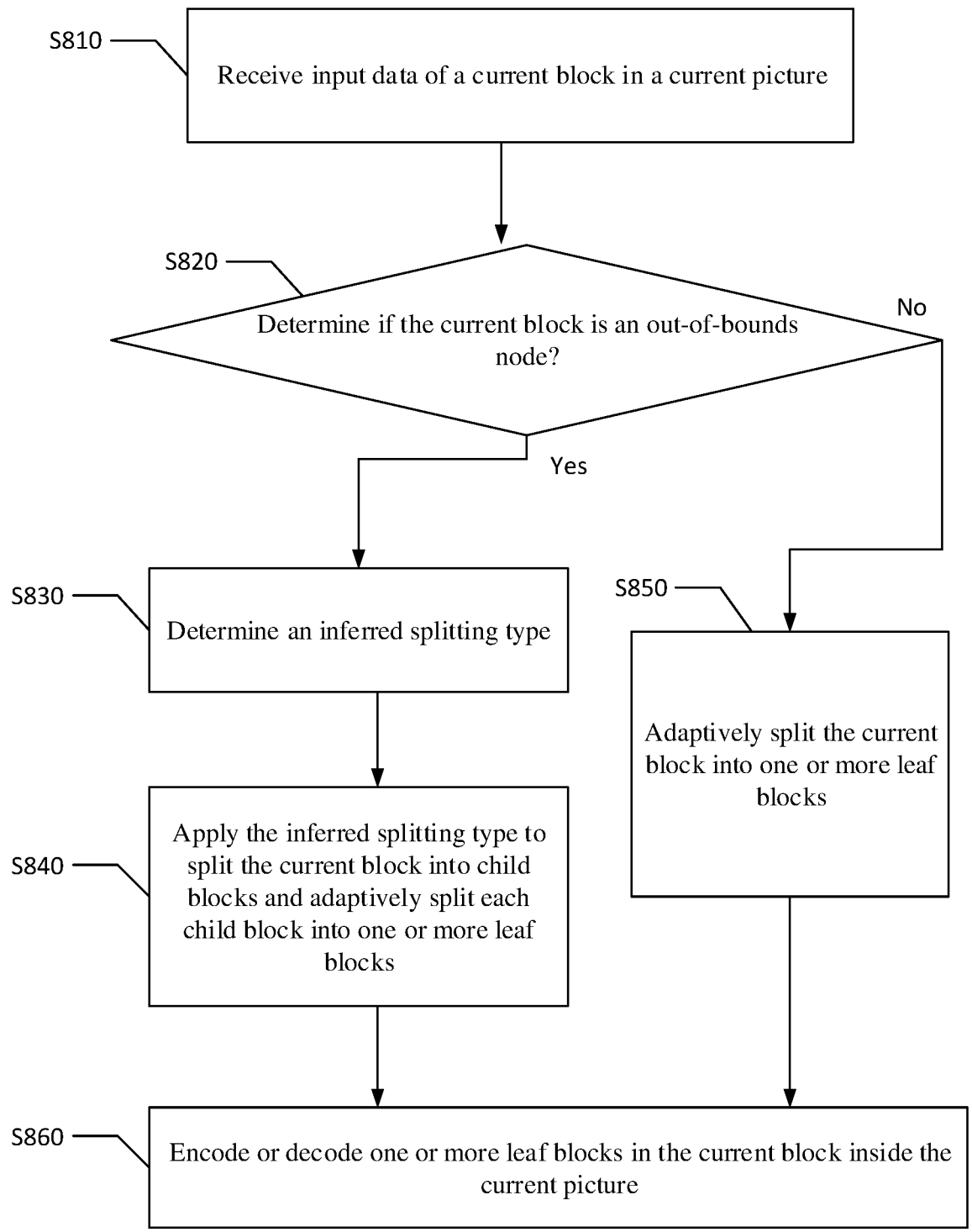
FIG. 8 is a flowchart illustrating an embodiment of the video processing method for encoding or decoding a current block in a current picture by splitting out-of-bounds nodes using an inferred splitting type.

Exemplary Flow Charts FIG. 8 is a flowchart illustrating an exemplary embodiment of the video processing method implemented in a video encoding or decoding system. The video encoding or decoding system in this exemplary embodiment processes video data in a current video picture by first receiving input data associated with a current block in step S810, and determines if the current block is an out-of-bounds node in step S820. The out-of-bounds node is a coding tree node with a block region across a current picture boundary. For example, the out-of-bounds node has a block region across a left picture boundary of the current picture or a bottom picture boundary of the current picture. If the current block is across the current picture boundary, the video encoding or decoding system determines an inferred splitting type for the current block in step S830. An example of the inferred splitting type is quadtree splitting. The inferred splitting type is applied to split the current block into child blocks, and then each child block is adaptively split into one or more leaf blocks in step S840, In other words, each child block is either a single leaf block or each child block is split into multiple leaf blocks. In step S850, the current block is adaptively split into one or more leaf blocks if the current block is not an out-of-bounds node. In other words, the current block is a single leaf block or it is split into multiple leaf blocks. In one embodiment, a partition constraint and re-visit constraint are applied when splitting each child block into one or more leaf blocks or splitting the current block into one or more leaf blocks, where the partition constraint restricts each leaf block to be completely contained in one pipeline unit or restricts each leaf block contains complete one or more pipeline units, and the re-visit constraint is violated if processing of the leaf blocks requires re-visiting a pipeline unit after leaving the pipeline unit. The pipeline unit is defined as a basic unit for pipeline processing, and the current picture is divided into multiple non-overlapping grids to allow different pipeline stages in the video coding system to process successive pipeline units simultaneously. The video encoding or decoding system then encodes or decodes the leaf blocks in the current block inside the current picture in step S860.

In another embodiment, the video encoding or decoding system determines whether the current block is an out-of-bounds node and is larger than a predefined size, and splits the current block using the inferred splitting type only if it is an out-of-bounds node and is larger than the predefined size. The current block is not forced to be partitioned by the inferred splitting type if it is an out-of-bounds node and is smaller than or equal to the predefined size. Some examples of the predefined size include a pipeline unit size, a maximum transform size, a multiple of the maximum transform size, 64×64 luma samples, or 128×128 luma samples.

Figure 9:
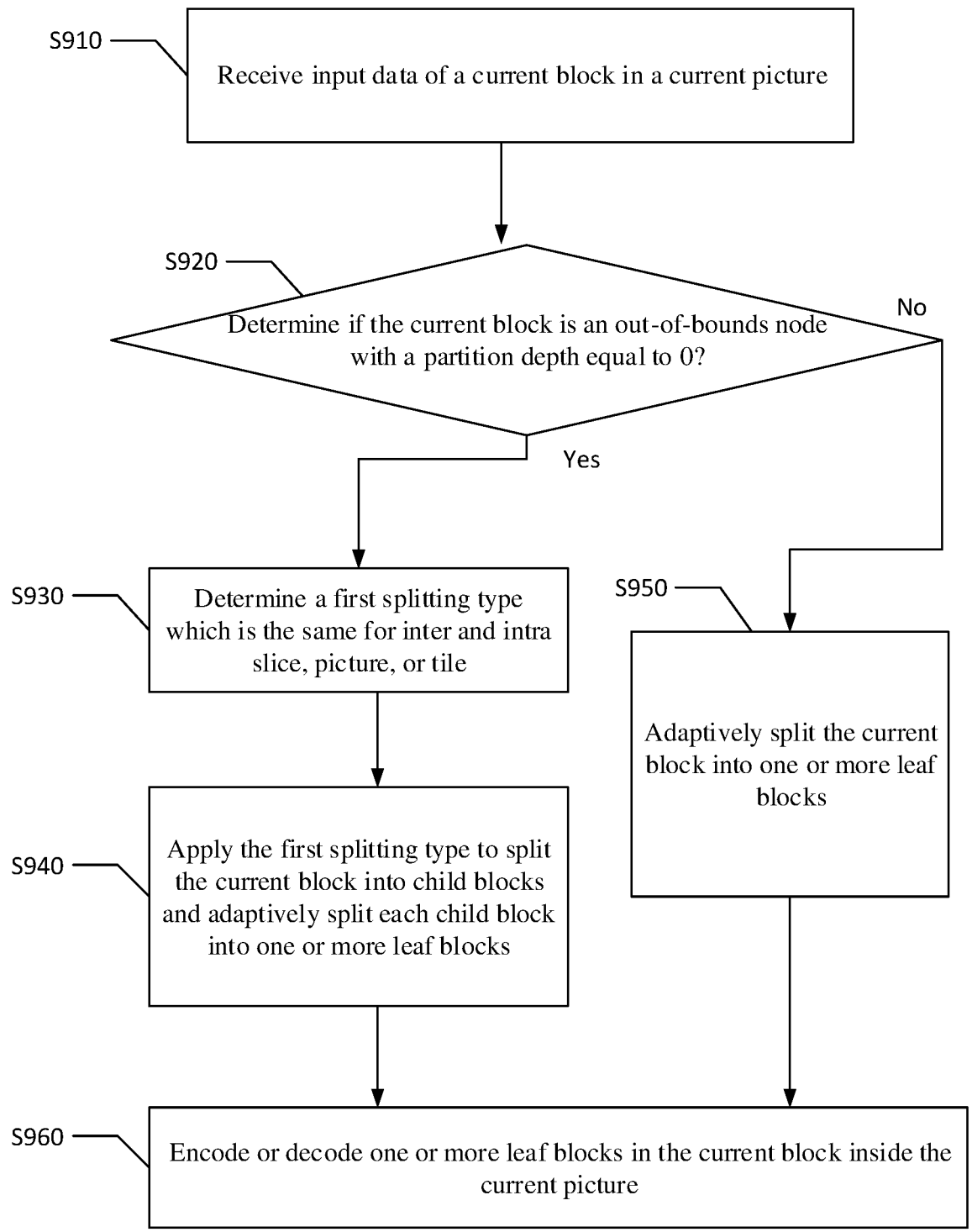
FIG. 9 is a flowchart illustrating another embodiment of the video processing method for encoding or decoding a current block in a current picture by splitting out-of-bounds nodes using a first splitting type.

FIG. 9 is a flowchart illustrating another exemplary embodiment of the video processing method that can be implemented in a video encoding or decoding system. The video encoding or decoding system receives input data of a current block in a current picture in step S910, and determines if the current block is an out-of-bounds node with a partition depth equal to 0 in step S920. The out-of-bounds node is a coding tree node having a block region across a current picture boundary. For example, the current picture is divided into non-overlapping Coding Tree Units (CTUs), and the current block is a CTU across a right picture boundary or a CTU across a bottom picture boundary. In step S930, the video encoding or decoding system determines a first split for out-of-bounds nodes with a partition depth equal to 0, and this first split for partitioning out-of-bounds nodes in an inter slice, picture, or tile is the same as the first split for partitioning out-of-bounds nodes in an intra slice, picture, or tile. In other words, the same first splitting type is determined for partitioning no matter if out-of-bounds nodes to be split are in inter or intra slices, pictures, or tiles. For example, the first split is quadtree splitting. The first split is applied to split the current block into child blocks, and each child block is adaptively split into one or more leaf blocks in step S940. If the current block is not an out-of-bounds node or if the current block is not at a partition depth equal to 0, the current block is adaptively split into one or more leaf blocks according to a conventional method in step S950. For example the video encoding system selects a best splitting structure for the current block and signals the partition information to allow the video decoding system to parse the partition information for decoding the current block. One or more leaf blocks in the current block inside the current picture are encoded or decoded in step S960. In one embodiment, a partitioning method satisfying a partition constraint is applied to split each child block in the current block or split the current block. The partition constraint restricts each leaf block to be completely contained in one pipeline unit or restricts each leaf block containing complete one or more pipeline units. In one embodiment, a re-visit constraint is applied when splitting each child block into one or more leaf blocks or splitting the current block into one or more leaf blocks, and the re-visit constraint is violated if processing of the leaf blocks requires re-visiting a pipeline unit after leaving the pipeline unit. In another embodiment, both the partition constraint and the re-visit constraint is applied for splitting the child blocks in the current block or splitting the current block.

Figure 10:
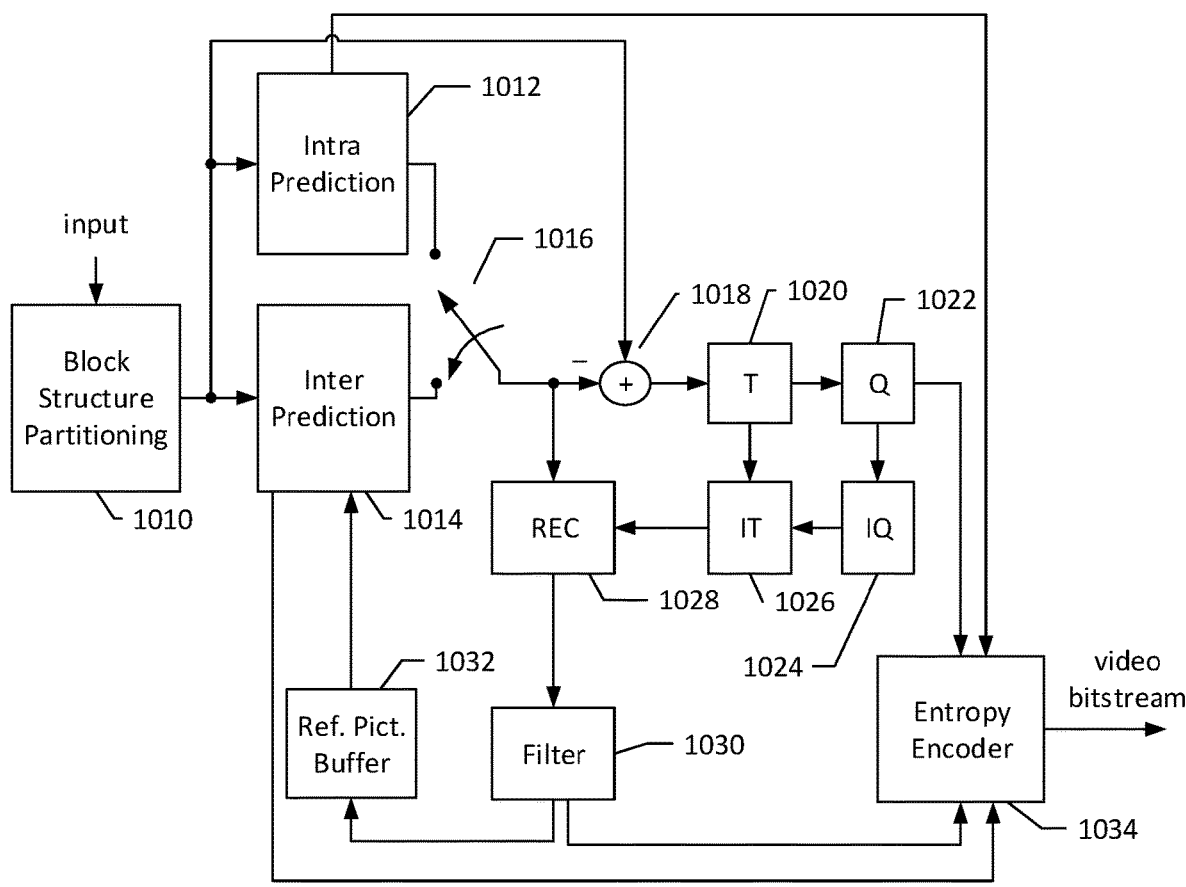
FIG. 10 illustrates an exemplary system block diagram for a video encoding system incorporating the video processing method according to embodiments of the present invention.

Exemplary System Block Diagram FIG. 10 illustrates an exemplary system block diagram for a Video Encoder 1000 implementing various embodiments of partitioning a current block with a partition constraint. A Block Structure Partitioning module 1010 receives input data of video pictures and determines a block partitioning structure for each block in the video picture to be encoded. In some embodiments of the present invention, if a current block is an out-of-bounds node, the Block Structure Partitioning module 1010 splits the current block into child blocks using an inferred splitting type, and then adaptively splits each child block into one or multiple leaf blocks. According to some other embodiments of the present invention, if the current block is an out-of-bounds node with a partition depth of 0, the Block Structure Partitioning module 1010 splits the current block into child blocks using a first splitting type. The first splitting type for partitioning out-of-bounds nodes in an inter slice, picture, or tile is the same as the first splitting type for partitioning out-of-bounds nodes in an intra slice, picture, or tile. For example, the current block is a CTU, and the first splitting type is quadtree splitting. In some embodiments, each child block of the out-of-bounds node is further split into leaf blocks according to one or both of a partition constraint and re-visit constraint. The partition constraint restricts each leaf block to be completely contained in one pipeline unit or restricts each leaf block to contain one or more complete pipeline units. The pipeline units are non-overlapping units in the current video picture designed for pipeline processing, and a pipeline unit size is predefined or implicitly defined based on a profile or level according to a video compression standard. For example, the pipeline unit size is set to a maximum transform block size. Each leaf block in the current picture is predicted by Intra prediction in Intra Prediction module 1012 or Inter prediction in Inter Prediction module 1014 to remove spatial redundancy or temporal redundancy. Intra Prediction module 1012 provides intra predictors for the leaf block based on reconstructed video data of the current picture. Inter Prediction module 1014 performs Motion Estimation (ME) and Motion Compensation (MC) to provide predictors for the leaf block based on video data from other video picture or pictures. A Switch 1016 selects either Intra Prediction module 1012 or Inter Prediction module 1014 to supply the predictor to Adder 1018 to form prediction errors, also called residues. The residues of the current leaf block are further processed by Transform (T) module 1020 followed by Quantization (Q) module 1022. The transformed and quantized residual signal is then encoded by Entropy Encoder 1034 to form a video bitstream. The video bitstream is then packed with side information. The transformed and quantized residual signal of the current leaf block is processed by Inverse Quantization (IQ) module 1024 and Inverse Transform (IT) module 1026 to recover the prediction residues. As shown in FIG. 10, the residues are recovered by adding back to the selected predictor at Reconstruction (REC) module 1028 to produce reconstructed video data. The reconstructed video data may be stored in Reference Picture Buffer (Ref. Pict. Buffer) 1032 and used by Inter Prediction module 1014 for prediction of other pictures. The reconstructed video data from REC 1028 may be subject to various impairments due to the encoding processing, consequently, In-loop Processing Filter 1030 is applied to the reconstructed video data before storing in the Reference Picture Buffer 1032 to further enhance picture quality.

Figure 11:
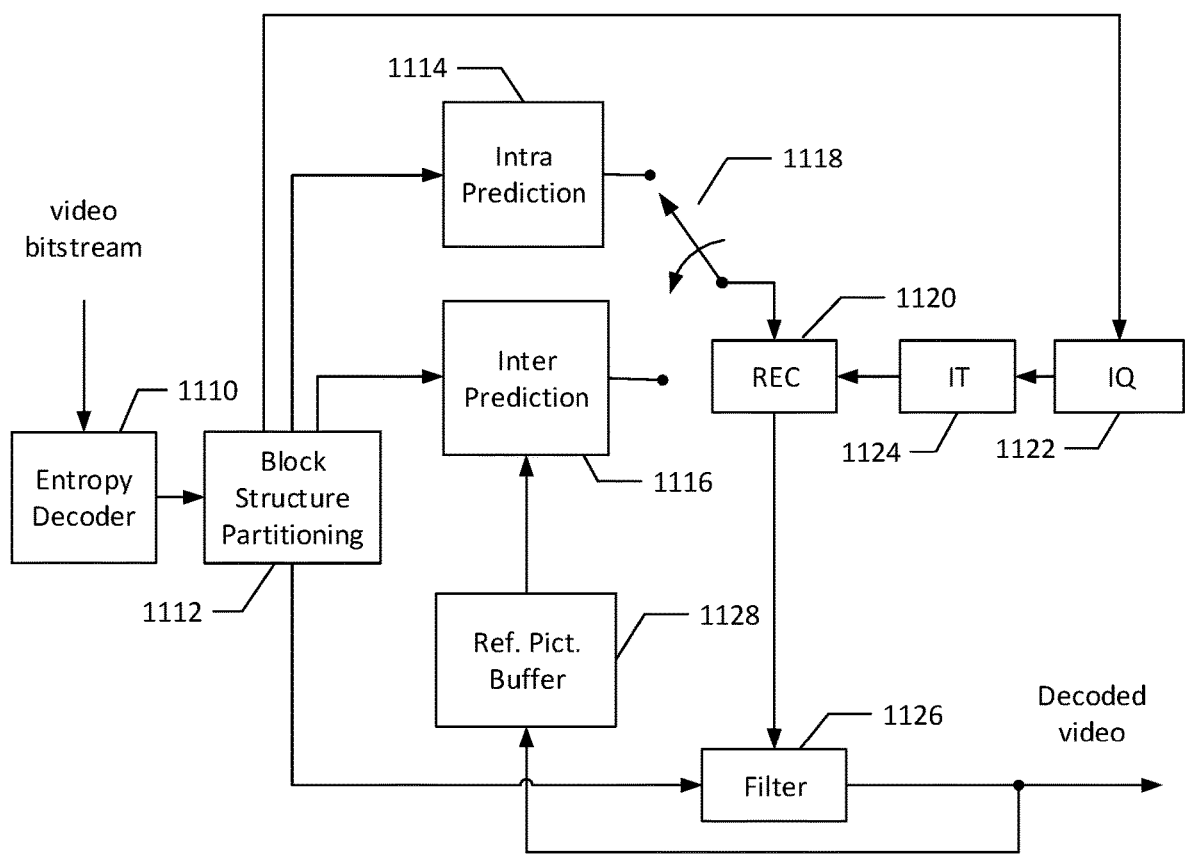
FIG. 11 illustrates an exemplary system block diagram for a video decoding system incorporating the video processing method according to embodiments of the present invention.

A corresponding Video Decoder 1100 for decoding the video bitstream generated by the Video Encoder 1000 of FIG. 10 is shown in FIG. 11. The input to the Video Decoder 1100 is decoded by Entropy Decoder 1110 to parse and recover the transformed and quantized residual signal and other system information. A Block Structure Partitioning module 1112 determines a block partitioning structure of each block in each video picture according to various embodiments of the present invention. In some embodiments, the Block Structure Partitioning module 1112 uses an inferred splitting type to partition all out-of-bounds blocks across one or both right picture boundary and bottom picture boundary. In one embodiment, the inferred splitting type is used to partition all out-of-bounds block larger than a predefined size, for example, the predefined size is equal to a pipeline unit size or a transform block size. Each out-of-bounds block is partitioned into child blocks by the inferred splitting type, and each child block is then adaptively split into one or more leaf blocks. In some other embodiments, the Block Structure Partitioning module 1112 uses a first splitting type to partition out-of-bounds blocks with a partition depth equal to 0, and the first splitting type for partitioning out-of-bounds blocks in an inter slice, picture, or tile is the same as the first splitting type for partitioning out-of-bounds blocks in an intra slice, picture, or tile. After splitting by the first splitting type, each child block is adaptively split into one or more leaf blocks. A partition constraint may be applied which restricts each leaf block to be completely contained in one pipeline unit or restricts each leaf block to contain one or more complete pipeline unit. The pipeline units are non-overlapping units in the current video picture designed for pipeline processing, and the size of the pipeline units is predefined or implicitly determined. The decoding process of the Decoder 1100 is similar to the reconstruction loop at the Encoder 1000, except the Decoder 1100 only requires motion compensation prediction in Inter Prediction module 1116. Each leaf block is decoded by either Intra Prediction module 1114 or Inter Prediction module 1116, and a Switch 1118 selects an Intra predictor or Inter predictor according to decoded mode information. The transformed and quantized residual signal associated with each leaf block is recovered by Inverse Quantization (IQ) module 1122 and Inverse Transform (IT) module 1124. The recovered residual signal is reconstructed by adding back the predictor in REC 1120 to produce reconstructed video. The reconstructed video is further processed by In-loop Processing Filter (Filter) 1126 to generate final decoded video. If a currently decoded video picture is a reference picture, the reconstructed video of the currently decoded video picture is also stored in Ref. Pict. Buffer 1128 for later pictures in decoding order.

Various components of the Video Encoder 1000 and Video Decoder 1100 in FIG. 10 and FIG. 11 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in the Encoder 1000 and Decoder 1100, and the memory electrically coupled with the processor is used to store the program instructions, information corresponding to the reconstructed data, and/or intermediate data during the encoding or decoding process. The memory in some embodiments includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 10 and 11, the Encoder 1000 and Decoder 1100 may be implemented in the same electronic device, so various functional components of the Encoder 1000 and Decoder 1100 may be shared or reused if implemented in the same electronic device. Any of the embodiments of the present invention may be implemented in a Block Structure Partitioning Module 1010 of the Encoder 1000, and/or a Block Structure Partitioning Module 1112 of the Decoder 1100. Alternatively, any of the embodiments may be implemented as a circuit coupled to the Block Structure Partitioning Module 1010 of the Encoder 1000 and/or the Block Structure Partitioning Module 1112 of the Decoder 1100, so as to provide the information needed by the entropy decoder 1110 or the Block Structure Partitioning Module 1112.

The proposed video processing method with one or more partition constraints may be applied as a normative constraint for both encoders and decoders or may be applied as an encoder non-normative constraint. For an example of the normative constraint, a partition syntax associated with splitting out-of-bounds blocks larger than a predefined size is not signaled and is inferred by both encoders and decoders. For an example of the encoder non-normative constraint, if a current block is an out-of-bounds block larger than a predefined size, a partition syntax is still signaled to a corresponding decoder, but the value of the partition syntax is a fixed or derived value.

Embodiments of the video processing methods with one or more partition constraints may be implemented in a circuit integrated into a video compression chip or program code integrated into video compression software to perform the processing described above. For examples, determining of a block partitioning structure for the current block may be realized in program codes to be executed on a computer processor, a Digital Signal Processor (DSP), a microprocessor, or Field Programmable Gate Array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
   receiving input data associated with a current block in a current picture;
   determining if the current block is an out-of-bounds node, wherein the out-of-bounds node is a coding tree node of the current picture with a block region across a current picture boundary;
   determining an inferred splitting type if the current block is an out-of-bounds node;
   applying the inferred splitting type to split the current block into child blocks if the current block is an out-of-bounds node, and then adaptively splitting each child block into one or more leaf blocks, or adaptively splitting the current block into one or more leaf blocks if the current block is not an out-of-bounds node; and
   encoding or decoding the one or more leaf blocks in the current block inside the current picture,
   wherein either:
   a partition constraint is applied when splitting each child block into one or more leaf blocks or splitting the current block into one or more leaf blocks, and the partition constraint restricts each leaf block to be completely contained in one pipeline unit or restricts each leaf block contains complete one or more pipeline units, wherein the pipeline unit is defined as a basic unit for pipeline processing, and the current picture is divided into multiple non-overlapping grids to allow different pipeline stages in the video coding system to process successive pipeline units simultaneously; or
   a re-visit constraint is applied when splitting each child block into one or more leaf blocks or splitting the current block into one or more leaf blocks, and the re-visit constraint is violated if processing of the leaf blocks requires re-visiting a pipeline unit after leaving the pipeline unit, wherein the pipeline unit is defined as a basic unit for pipeline processing, and the current picture is divided into multiple non-overlapping grids to allow different pipeline stages in the video coding system to process successive pipeline units simultaneously.

2. The method of claim 1, further comprising determining whether the current block is larger than a predefined size when the current block is an out-of-bounds node, splitting the current block using the inferred splitting type only if the current block is larger than the predefined size, and the current block is not forced to be partitioned by the inferred splitting type if the current block is smaller than or equal to the predefined size.

3. The method of claim 2, wherein the predefined size is set to be a pipeline unit size, maximum transform size, or a multiple of the maximum transform size.

4. The method of claim 3, wherein the pipeline unit size is a size of a pipeline unit, wherein the pipeline unit is defined as a basic unit for pipeline processing, and the current picture is divided into multiple non-overlapping grids to allow different pipeline stages in the video coding system to process successive pipeline units simultaneously.

5. The method of claim 2, wherein splitting information of the inferred splitting type for partitioning out-of-bounds nodes larger than the predefined size is not signaled or parsed.

6. The method of claim 1, wherein the inferred splitting type for out-of-bounds nodes is quadtree splitting.

7. The method of claim 1, wherein the inferred splitting type is determined according to the current picture boundary, wherein the inferred splitting type is horizontal binary-tree splitting when the current block is across a bottom picture boundary or the inferred splitting type is vertical boundary-tree splitting when the current block is across a right picture boundary.

8. The method of claim 1, wherein adaptively splitting each child block further comprises determining if any child block split from the current block is across a pipeline unit boundary, and splitting the child blocks into leaf blocks until none of the leaf blocks is across the pipeline unit boundary, wherein the pipeline unit boundary is a boundary of a pipeline unit for pipeline processing, and the current picture is divided into multiple non-overlapping grids to allow different pipeline stages in the video coding system to process successive pipeline units simultaneously.

9. The method of claim 1, wherein adaptively splitting each child block further comprises determining if a width or height of any child block is larger than a threshold, and splitting the child block with a width or height larger than the threshold until the width or height is smaller than or equal to the threshold, wherein the threshold is equal to a pipeline unit width or height, a maximum transform width or height, or a multiple of the maximum transform width or height.

10. The method of claim 1, wherein the inferred splitting type for out-of-bounds node is one of valid splitting types, wherein each of the valid splitting types splits the current block into child blocks not crossing a pipeline unit boundary.

11. The method of claim 1, wherein the current block is a coding tree node with a split depth equal to 0, and the inferred splitting type for the current block is the same for all out-of-bounds nodes in inter and intra slices, pictures, or tiles.

12. A method of processing video data in a video coding system, comprising:
receiving input data associated with a current block in a current picture;
determining if the current block is an out-of-bounds node with a split depth equal to 0, wherein the out-of-bounds node is a coding tree node having a block region across a current picture boundary;
determining a first splitting type if the current block is an out-of-bounds node with a split depth equal to 0, wherein the first splitting type for partitioning out-of-bounds nodes with a split depth equal to 0 in an inter slice, picture, or tile is the same as the first splitting type for partitioning out-of-bounds nodes with a split depth equal to 0 in an intra slice, picture, or tile;
applying the first splitting type to split the current block into child blocks if the current block is an out-of-bounds node with a split depth equal to 0, and adaptively splitting each child block into one or more leaf blocks, or adaptively splitting the current block into one or more leaf blocks if the current block is not an out-of-bounds node with a split depth equal to 0; and
encoding or decoding the one or more leaf nodes of the current block inside the current picture,
wherein either:
a partition constraint is applied when splitting each child block into one or more leaf blocks or splitting the current block into one or more leaf blocks, and the partition constraint restricts each leaf block to be completely contained in one pipeline unit or restricts each leaf block contains complete one or more pipeline units, wherein the pipeline unit is defined as a basic unit for pipeline processing, and the current picture is divided into multiple non-overlapping grids to allow different pipeline stages in the video coding system to process successive pipeline units simultaneously; or
a re-visit constraint is applied when splitting each child block into one or more leaf blocks or splitting the current block into one or more leaf blocks, and the re-visit constraint is violated if processing of the leaf blocks requires re-visiting a pipeline unit after leaving the pipeline unit, wherein the pipeline unit is defined as a basic unit for pipeline processing, and the current picture is divided into multiple non-overlapping grids to allow different pipeline stages in the video coding system to process successive pipeline units simultaneously.

13. The method of claim 12, wherein the first splitting type for out-of-bounds nodes with a split depth equal to 0 is quadtree splitting.

14. The method of claim 12, wherein when the current block is an out-of-bounds node with a split depth equal to 0, a same partitioning method is applied to partition the child blocks in the current block in the inter slice, picture, or tile and partition the child blocks in the current block in the intra slice, picture, or tile.

15. An apparatus of processing video data in a video coding system, the apparatus comprising one or more electronic circuits configured for:
receiving input data associated with a current block in a current picture;
determining if the current block is an out-of-bounds node, wherein the out-of-bounds node is a coding tree node of the current picture with a block region across a current picture boundary;
determining an inferred splitting type if the current block is an out-of-bounds node;
applying the inferred splitting type to split the current block into child blocks if the current block is an out-of-bounds node, and then adaptively splitting each child block into one or more leaf blocks, or adaptively splitting the current block into one or more leaf blocks if the current block is not an out-of-bounds node; and
encoding or decoding the one or more leaf blocks in the current block inside the current picture,
wherein either:
a partition constraint is applied when splitting each child block into one or more leaf blocks or splitting the current block into one or more leaf blocks, and the partition constraint restricts each leaf block to be completely contained in one pipeline unit or restricts each leaf block contains complete one or more pipeline units, wherein the pipeline unit is defined as a basic unit for pipeline processing, and the current picture is divided into multiple non-overlapping grids to allow different pipeline stages in the video coding system to process successive pipeline units simultaneously; or a re-visit constraint is applied when splitting each child block into one or more leaf blocks or splitting the current block into one or more leaf blocks, and the re-visit constraint is violated if processing of the leaf blocks requires re-visiting a pipeline unit after leaving the pipeline unit, wherein the pipeline unit is defined as a basic unit for pipeline processing, and the current picture is divided into multiple non-overlapping grids to allow different pipeline stages in the video coding system to process successive pipeline units simultaneously.

16. A non-transitory computer readable medium storing program instruction causing a processing circuit of an apparatus to perform a video processing method for video data, and the method comprising:

receiving input data associated with a current block in a current picture;

determining if the current block is an out-of-bounds node, wherein the out-of-bounds node is a coding tree node of the current picture with a block region across a current picture boundary;

determining an inferred splitting type if the current block is an out-of-bounds node;

applying the inferred splitting type to split the current block into child blocks if the current block is an out-of-bounds node, and then adaptively splitting each child block into one or more leaf blocks, or adaptively splitting the current block into one or more leaf blocks if the current block is not an out-of-bounds node; and encoding or decoding the one or more leaf blocks in the current block inside the current picture, wherein either:

a partition constraint is applied when splitting each child block into one or more leaf blocks or splitting the current block into one or more leaf blocks, and the partition constraint restricts each leaf block to be completely contained in one pipeline unit or restricts each leaf block contains complete one or more pipeline units, wherein the pipeline unit is defined as a basic unit for pipeline processing, and the current picture is divided into multiple non-overlapping grids to allow different pipeline stages in the video coding system to process successive pipeline units simultaneously; or a re-visit constraint is applied when splitting each child block into one or more leaf blocks or splitting the current block into one or more leaf blocks, and the re-visit constraint is violated if processing of the leaf blocks requires re-visiting a pipeline unit after leaving the pipeline unit, wherein the pipeline unit is defined as a basic unit for pipeline processing, and the current picture is divided into multiple non-overlapping grids to allow different pipeline stages in the video coding system to process successive pipeline units simultaneously.

* * * * *